United States Patent [19]

Reime

[11] Patent Number: 5,499,396
[45] Date of Patent: Mar. 12, 1996

[54] TRANSMISSION DEVICE FOR TRANSMITTING A WANTED SIGNAL MODULATED ON A CARRIER

[75] Inventor: Gerd Reime, Schomberg, Germany

[73] Assignee: Nokia Technology GmbH, Pforzheim, Germany

[21] Appl. No.: 256,427

[22] PCT Filed: Dec. 5, 1992

[86] PCT No.: PCT/EP92/01041

§ 371 Date: Jul. 12, 1994

§ 102(e) Date: Jul. 12, 1994

[87] PCT Pub. No.: WO93/23951

PCT Pub. Date: Nov. 25, 1993

[51] Int. Cl.⁶ .................................................. H04B 1/10
[52] U.S. Cl. .................. 455/266; 455/200.1; 455/307
[58] Field of Search ........................... 455/200.1, 233.1, 455/236.1, 250.1, 266, 307, 203

[56] References Cited

U.S. PATENT DOCUMENTS

| | | |
|---|---|---|
| 3,573,667 | 4/1971 | Kao et al. . |
| 4,179,710 | 12/1979 | Ishiguro et al. . |
| 4,189,745 | 2/1980 | Ushio et al. . |
| 4,284,942 | 8/1981 | Bigley et al. . |
| 4,466,133 | 8/1984 | Price ................................ 455/266 X |
| 4,672,670 | 6/1987 | Wang et al. ........................ 381/47 |
| 4,796,101 | 1/1989 | Kupfer . |
| 4,866,779 | 9/1989 | Kennedy et al. ................... 455/266 X |
| 4,966,160 | 10/1990 | Birck et al. ........................ 128/746 |
| 5,230,098 | 7/1993 | Seki .................................. 455/266 X |
| 5,369,470 | 11/1994 | Hansen .............................. 455/266 X |

Primary Examiner—Reinhard J. Eisenzopf
Assistant Examiner—Chi H. Pham
Attorney, Agent, or Firm—Ware, Fressola, Van Der Sluys & Adolphson

[57] ABSTRACT

Wired into the transmission path (2) of a transmission arrangement (1) to transmit a useful signal (NS), especially an audio or data signal, that is modulated onto a carrier signal (TS), is a bandpass filter (5) whose filter quality (G) can be adjusted. An error signal circuit (9) connected to the transmission path on the output side of the bandpass filter detects missing or excessively low amplitudes of the carrier signal and produces therefrom an error frequency signal (FS) with which, by means of a characteristic curve (G=f(FS)), the quality of the bandpass filter (5) is set and thereby the bandpass filter (5) is switched, in the manner of a cross-fade, from a wide transmission bandwidth to a high voltage superelevation in order to regenerate the amplitude of the carrier signal.

6 Claims, 3 Drawing Sheets

TRANSMISSION DEVICE FOR TRANSMITTING A WANTED SIGNAL MODULATED ON A CARRIER

The invention concerns a transmission arrangement for transmitting a useful signal modulated onto a carrier oscillation.

BACKGROUND OF THE INVENTION

Transmission arrangements for transmitting a useful signal modulated onto a carrier oscillation, with a bandpass filter wired into the transmission path of the useful signal in the transmission arrangement, and tuned to the frequency of the carrier oscillation, are known especially from radio or broadcast technology or data technology. These useful signals are designed to be transmitted so that at the reception location, they deliver at least somewhat reliable information for further processing of the data, or for reproduction of an audio or video depiction.

In the transmission of amplitude-modulated useful signals, for example audio signals in the shortwave region, fading occurs especially at night or over long broadcast distances; this distorts the transmitted useful signal, and superimposes interference noise onto it, to such as extent that the information in this useful signal, for example speech and music, is understandable or recognizable only with difficulty, or at times not at all. The same applies to data signals transmitted in this manner. However, in large and sparsely populated regions of the world the only economical way in which to disseminate news and/or entertainment broadcasts is by means of amplitude-modulated useful signals.

On the other hand, the transmission of frequency-modulated useful signals also raises problems of highly variable reception field strengths, especially in heavily built-up or mountainous regions. At very low field strengths considerable interference occurs especially in the outer regions of the sidebands—i.e. in the higher-tone region for an audio frequency transmission—causing severe noise particularly in these regions.

In the transmission of frequency-modulated useful signals that have previously been recorded on videotape, an undesirable loss of information results from the fact that the upper sideband is almost completely cut off. To restore this sideband at least partially, a patent application DE 40 35 309.5—unpublished at the time this invention was filed—proposes to arrange in the transmission path of the useful signal an amplitude-controlled delay element that changes the phase of the individual oscillations as a function of the amplitude of those oscillations, thereby producing an oscillation that contains both the lower and the upper sideband as information. This application also proposes that in a soft circuit transition, a relatively narrow-band bandpass filter be inserted into the transmission path, instead of the delay element if it is no longer possible to guarantee fairly good demodulation of the transmitted useful signal. For this purpose, the proposed distortion correction circuit contains an error detector which recognizes, and classifies as errors, instances in which expected oscillations are missing or are transmitted at such low amplitude that they do not reach a threshold set in the error detector; and which generates an error signal characterizing the frequency with which errors occur. Soft switching from delay mode to bandpass filter mode then occurs on the basis of error frequency, in such a way that as the error frequency rises, bandpass filter mode is already activated at low signal amplitudes. With the proposed features, not only is the more suitable of two selectable distortion correction arrangements selected on the basis of signal amplitude, but the selection boundary is also defined as a function of error frequency.

SUMMARY OF THE INVENTION

The underlying object of the invention is to indicate a circuit arrangement to implement features for restoring information in a transmitted useful signal that is lost in transmission and is not located in the region of single-sided sideband clipping. In accordance with the invention, this object is achieved by a circuit arrangement to eliminate distortion from the information in a useful signal (NS), which is modulated to a carrier oscillation (TS) without single sideband reduction, and is received distorted by a receiver because of the transmission, with a band-pass filter (5) that is tuned to the frequency (f(T)) of the carrier oscillation, which precedes a demodulator (6) of the receiver, and with an error signal circuit (9) that influences the band-pass filter, which recognizes the oscillations in the band-pass filter, whose amplitude remains below a threshold value (SW) adjusted by the error signal circuit, and produces an error rate signal (FS) that corresponds to the frequency of the recognized error oscillations, characterized in that a Q-switch circuit (7) is connected to the band-pass filter (5) for the filter quality (G), whose control input receives the error rate signal (FS), with a quality transducer curve (10) through which, on the one hand, a filter quality (GO) is adjusted in the band-pass filter when the error rate signal is missing, where the filter bandwidth (Bf18) is at least equal to the transmission bandwidth of the received useful signal (NS), and through which, on the other hand, the filter quality (Gm) is adjusted in the band-pass filter with an upper value (FSn) of the error signal produced for a still adjustable error rate, at which the carrier oscillation (TS) exhibits the overvoltage in the band-pass filter output.

The assumption behind the invention is that the aforesaid losses of information in the transmitted useful signals at the reception location where information is reproduced or processed are caused especially by a mismatch between the carrier amplitude and the amplitudes of the sideband oscillations—or, with amplitude modulation, the amplitudes of the useful signal's oscillations during demodulation—and that very highly de-attenuated bandpass filter circuits, tuned to the carrier frequency, can largely correct this mismatch by greatly superelevating the voltage and simultaneously restricting the bandwidth. A high level of information quality is therefore recovered with the features of the invention, without a great deal of circuit complexity.

The subsidiary Claims characterize advantageous embodiments of the invention.

The invention will be described below in more detail with reference to advantageous exemplary embodiments, to which the scope of the invention claimed in the Claims is not limited. In the attached drawings:

DESCRIPTION OF THE BEST MODE

Figure 1:
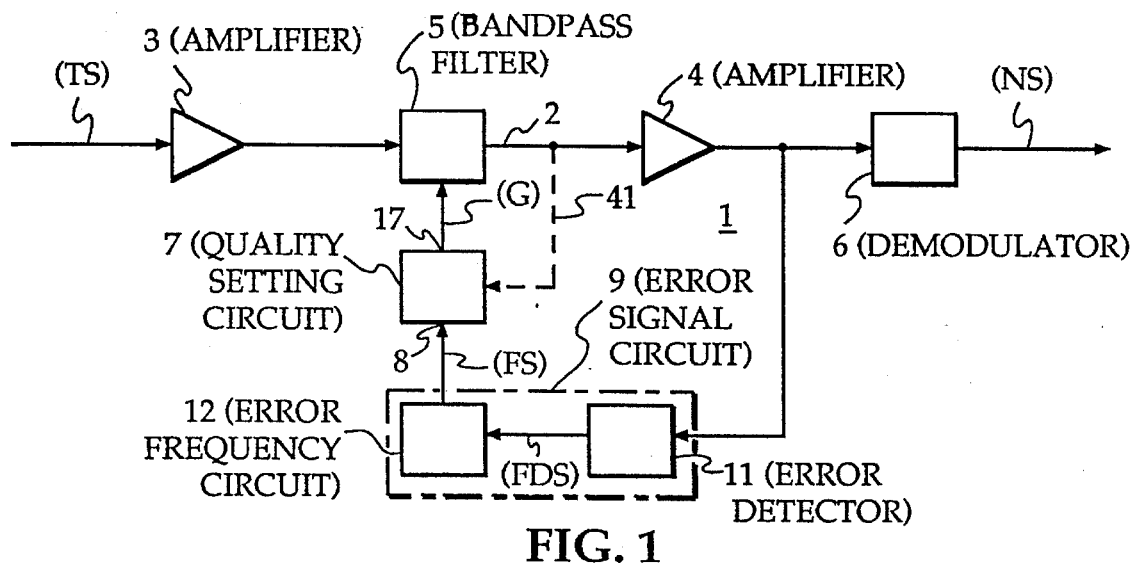
FIG. 1 shows a block diagram of a transmission arrangement with an error detector, and a bandpass filter whose filter quality can be adjusted by it.
Figure 3:
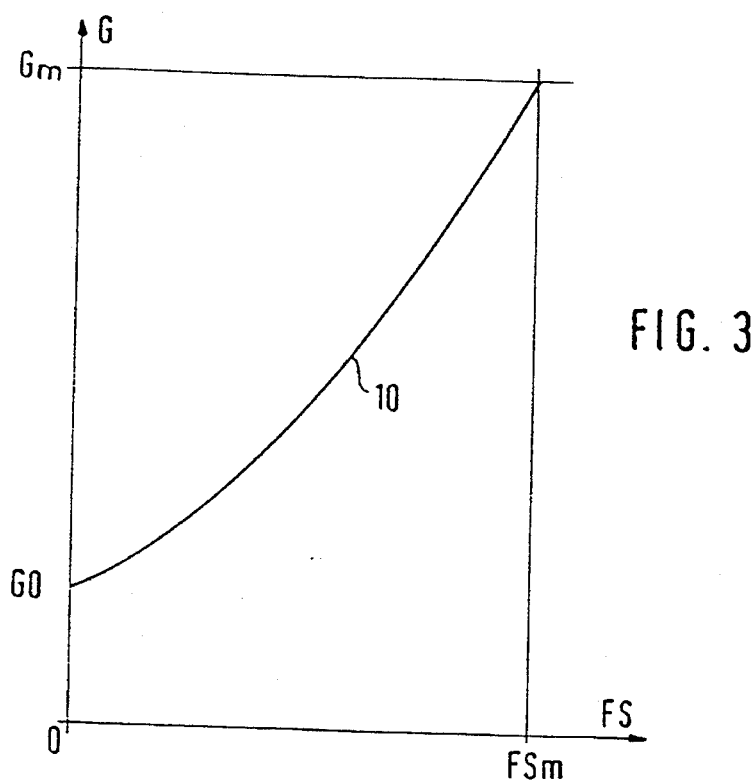
FIG. 3 shows a quality converter characteristic curve.

FIG. 1 depicts a circuit arrangement 1 arranged in a transmission path 2 of a radio receiver, transmitting a useful signal NS, modulated onto a carrier signal TS, to eliminate distortion from information in the useful signal NS. The circuit arrangement 1 contains a bandpass filter 5 represented by a resonance circuit having a quality Q and arranged between two buffer amplifiers 3 and 4 and is preceded by a demodulator. The bandpass filter can be designed with LC circuits, gyrators, active circuit elements of an electronic circuit, and/or other suitable circuit elements. In the demodulator 6, the useful signals NS are separated from the carrier signal TS and delivered to the output of the demodulator 6 for subsequent transmission and processing. Connected to the bandpass filter 5 is a quality setting circuit 7 for controlling the quality Q of the resonance bandpass filter circuit 5, that can also be a component of the bandpass filter 5, and that is set at its setting input 8, by an error frequency signal FS of an error signal circuit 9, to a state in which a specific value of the filter quality G of the bandpass filter 5 connected to the quality setting circuit 7 is correlated with a specific value of the error frequency signal FS. This correlation is achieved by means of a quality converter characteristic curve 10 set in the quality setting circuit 7, which describes the way in which the quality setting circuit performs its setting function and is depicted in FIG. 3 as the curve 10. The error signal circuit 3 contains an error detector 11—the input of which is connected to the bandpass filter output portion of the signal transmission path 2—and an error frequency circuit 12, downstream from the error detector, which creates, from the error detector signals FDS, an error frequency signal FS indicating the frequency of occurrence of the detection signals generated by the error detector 11.

Figure 2:
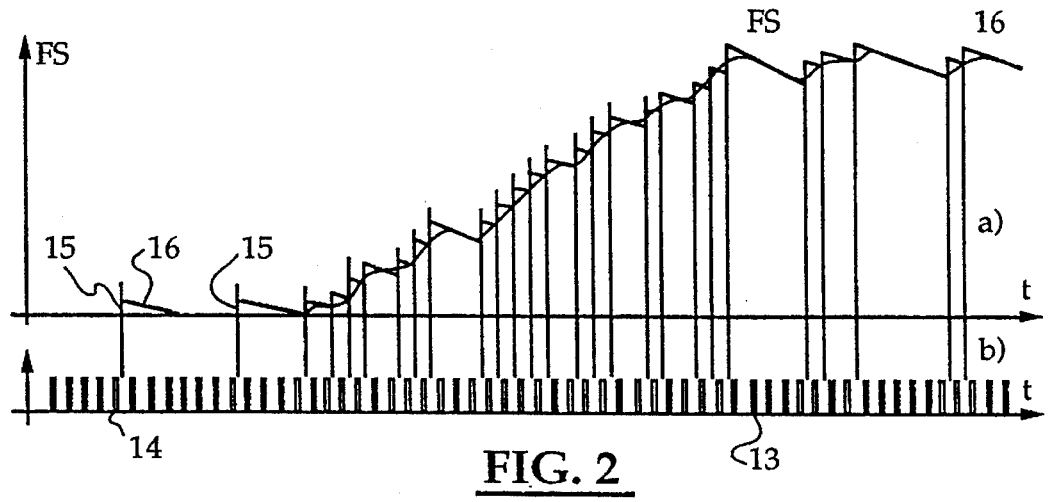
FIG. 2 shows a diagram a) with actual and expected oscillations of a detected train of oscillations, and a diagram b) with the error signal curve constituted from the error signal pulses of diagram a) and indicating the error frequency.

In the exemplary embodiment depicted, the error detector contains a circuit to recognize the frequency of the carrier oscillation, so that the times at which an oscillation of the carrier signal is expected are defined. If the error detector observes, at this point in time, an oscillation with an amplitude that exceeds a threshold value set in the error detector, no error detector signal is output. This case is depicted schematically in diagram b) of FIG. 2 by a solid pulse 13. If an oscillation with sufficient amplitude does not occur at the expected time—which is depicted schematically in diagram b) of FIG. 2 by a hollow pulse 14—the error detector, after the waiting time has elapsed, generates an error detector pulse (FDS) identified in diagram a) of FIG. 2 by a vertical line 15. From these pulses, the error frequency circuit 12 constructs the error frequency signal FS, the profile 16 of which is schematically depicted in diagram a) of FIG. 2.

The output 17 of the quality setting circuit 7 constitutes, with the bandpass filter 5, a bandpass filter circuit with filter quality G, which is set in the quality setting circuit 7 by means of the quality converter characteristic curve 10 (depicted in FIG. 3) of the quality setting circuit, as a function of the error frequency signal FS delivered to the quality setting circuit. If the error frequency signal FS has a value of 0—in other words if the error detector 11 does not detect any errors in transmission of the useful signal—a minimum filter quality G0 is set in the quality setting circuit. As a result, a bandpass filter transmission curve 18 (depicted schematically in FIG. 4) with a bandwidth Bf18 is set in the bandpass filter circuit 5/17; this bandwidth is at least as great as the useful bandwidth of the useful signals NS being transmitted with the carrier oscillation TS.

Figure 4:
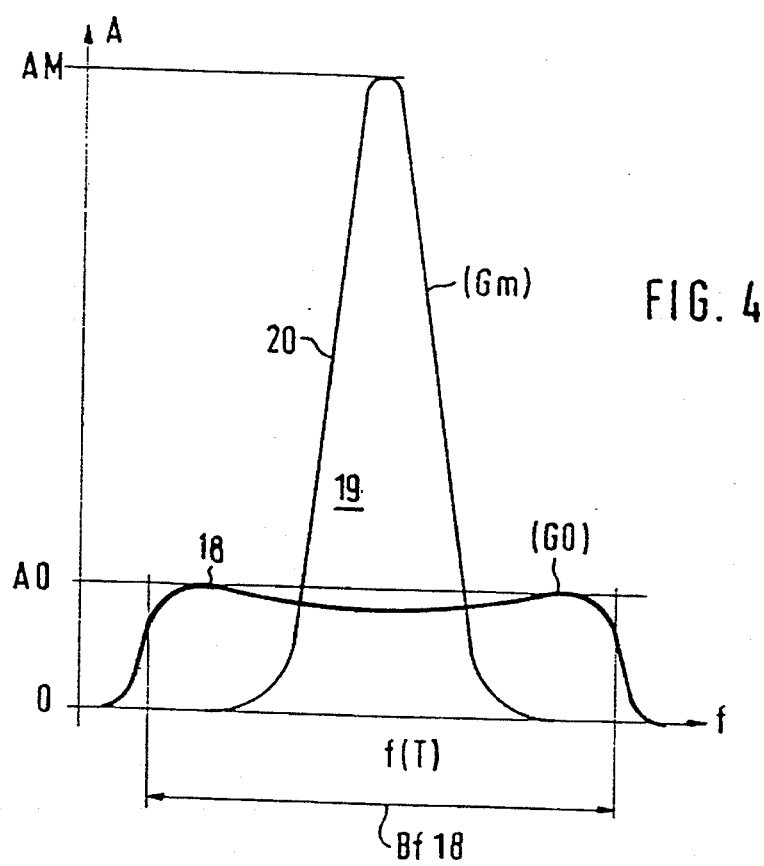
FIG. 4 shows bandpass filter transmission curves for various filter quality settings of the bandpass filter.

As the transmission quality of the useful signal decreases, the error frequency detected by the error signal circuit 9 increases. The decreasing quality of the useful transmission is compensated for by an increasing rise in the amplitude 19 of the carrier signal TS. For this purpose, the filter quality G of the bandpass filter circuit 5/17 is raised as the value of the error frequency signal FS increases, as shown by the quality converter characteristic curve 10. The increase in the filter quality G of the bandpass filter circuit results, at the output side of the bandpass filter, in an increasing voltage superelevation in the carrier amplitude, which improves the transmission quality of the useful signal and lowers the detected error frequency again. This counteracting effect on the error frequency produces a stable and optimal setting of the filter quality G of the bandpass filter circuit 5/17. In the exemplary embodiment depicted, the quality converter characteristic curve 10 is configured so that with the error frequency signal FS at a maximum value FSm, it reaches approximately its maximum quality value Gm, which in the exemplary embodiment depicted is still located well before the onset of oscillation of the bandpass filter circuit 5/17. The associated voltage superelevation curve 20 is depicted in FIG. 4, and at the carrier frequency f(T) achieves a voltage superelevation for the amplitude Am of the carrier signal TS of more than 30 dB.

In other exemplary embodiments, instead of damping the bandpass filter 5 it is possible to design the quality setting circuit as an adjustable feedback circuit, the feedback factor of which is set by means of the error frequency signal FS generated by the error signal circuit 9 so as in turn to produce, between the filter quality G set at the bandpass filter 5 and the error frequency signal FS generated by the error signal circuit 9, a correlation corresponding to the quality converter characteristic curve 10. In an exemplary embodiment corresponding to FIG. 1 with a feedback circuit as the quality setting circuit, the feedback circuit is connected to the output of the bandpass filter via a feedback line 41 drawn with dashes.

In exemplary embodiments of the transmission arrangement 1, the error detector 11 can be designed so that it detects errors in individual carrier oscillations or, in other exemplary embodiments, error characteristics of a specific group of cohesive oscillations, including incorrect shaping of an envelope curve of this type of oscillation train of the transmission.

Figure 5:
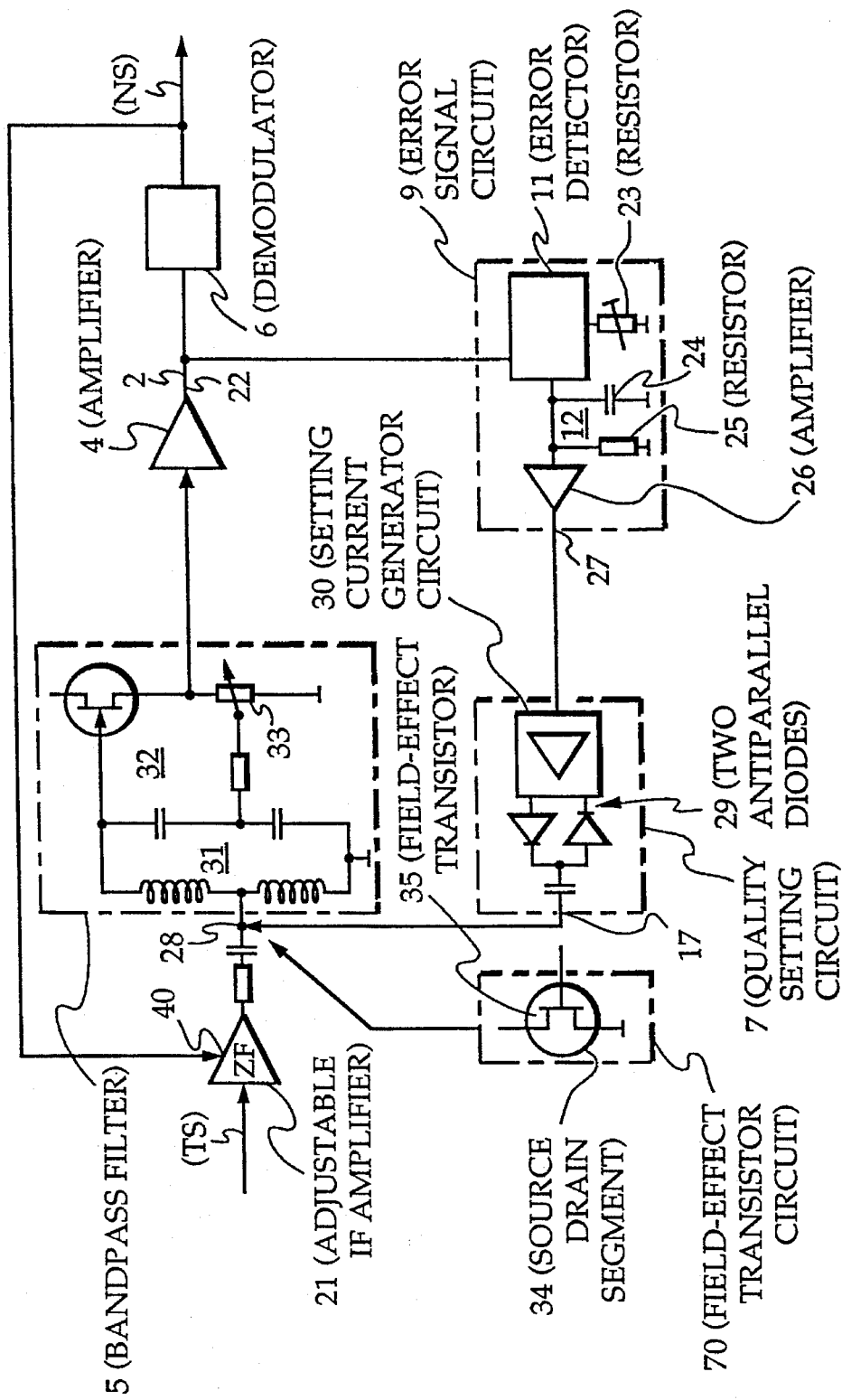
FIG. 5 shows a circuit diagram, more detailed in some places, of an exemplary embodiment of a transmission arrangement with a bandpass filter with adjustable filter quality and an error detector to set the filter quality of the bandpass filter.

FIG. 5 depicts a further exemplary embodiment of a transmission arrangement for transmitting a useful signal modulated onto a carrier oscillation, which shows additional details as compared with the exemplary embodiment depicted in FIG. 1. Arrangements corresponding to one another are identified by the same reference numbers. To transmit a useful signal NS modulated by amplitude modulation onto a carrier signal TS, an adjustable IF amplifier 21, a bandpass filter 5, a matching amplifier 4, and an AM demodulator 6 are arranged sequentially in the transmission path 2. The error signal circuit 9 connected to the output 22 of the matching amplifier 4 contains an error detector 11 (the detection threshold of which can be adjusted at a resistor 23) and an error frequency circuit 12 consisting of a storage capacitor 24 and a shunting resistor 25, as well as a matching amplifier 26. Connected between the output 27 of the error frequency circuit 12 and the input 28 of the bandpass filter is a quality setting circuit 7, containing two AC-antiparallel diodes 29 (representing adjustable damping resistors to damp the bandpass filter 5) and a setting current generator circuit 30 to generate the setting current for the diodes 29. The setting current for the diodes 29 is generated in the setting current generator circuit 30 as a function of the error frequency signal FS delivered to the setting current generator circuit 30, so as to result, in conjunction with the resistance characteristics of the shunting diodes 29 and the bandpass filter 5, for example in the quality converter characteristic curve 10 depicted in FIG. 3.

In the exemplary embodiment depicted, the bandpass filter 5 contains an LC bandpass filter circuit 31 followed by a feedback amplifier including an adjusting resistor 33 to set the maximum filter quality Gm, prior to application of the oscillations when the diodes 29 of the quality setting circuit 7 are blocked. With these features, filter quality values of well above 30 dB can be achieved for the bandpass filter 5.

In another embodiment of a quality setting circuit 70, depicted schematically in FIG. 5 to the left of the quality setting circuit 7, the adjustable shunting resistor which damps the bandpass filter circuit 5/17 is the drain-source segment 34 of an adjustable field-effect transistor 35, in a circuit embodiment not depicted in greater detail. A further possible embodiment of the system for adjusting the filter quality G of the bandpass filter 5 consists, for example, in designing the adjusting resistor 33 of the feedback amplifier 32 in the bandpass filter 5 as an electronic variable resistor whose resistance ratio for feeding back the positive or negative feedback signal is electronically set by means of the value of the error frequency signal FS, so as thereby to produce a characteristic curve corresponding to the quality conversion characteristic curve depicted in FIG. 3.

In another advantageous embodiment of the transmission arrangement 1, the error signal circuit 9 is a fast-response modulation depth measurement circuit, which, when a measured or detected modulation depth exceeds a certain value, generates at its output an error frequency signal FS whose signal value depends on the value of the modulation depth that is impermissible and must therefore be corrected by the error frequency signal.

With AM-transmitted useful signals, the error signal circuit 9 contained in the transmission arrangement according to FIG. 5 detects the modulation depth by producing an error frequency signal FS (the value of which represents the number of oscillations per unit time) whose amplitude is less than a threshold SW set at the adjusting resistor 23 of the error signal circuit 9. This threshold is, for example, set so that an error is detected at a modulation depth M equal to or greater than 70%, with the modulation depth being the ratio between the amplitude of the useful signal NS and the amplitude of the carrier signal TS. To achieve this, however, the amplitude of the transmission signal at the input 28 of the bandpass filter must be regulated to a specific average amplitude height. A regulating input 40 of the input-side adjustable IF amplifier 21 of the transmission path 2 is therefore connected to the output of the AM demodulator 6.

As a result of these features, on the one hand a modulation depth is set that is optimum for AM demodulation, regardless of the modulation depth at which the useful signal NS is transmitted to the input 28 of the bandpass filter 5. On the other hand, wandering or fluctuating holes in the transmission signal caused by deletions or other interference, which result from deletions of various magnitudes in the carrier signal TS, are interpreted as modulation errors and, in the same way as modulation errors, are largely corrected by the amplitude superelevation applied to the bandpass filter, which substantially improves the quality of the transmitted useful signal.

In the transmission of frequency-modulated useful signals NS on a carrier signal TS for broadcast purposes, the reception field strength in broadcast transmission "shadow" areas can become so low that especially-the outer edges of the sidebands of an FM-transmitted useful signal can be severely disrupted. In this case as well, the error detector 11 of a transmission arrangement 1 depicted as an example in FIG. 1 detects an increasing level of excessively low or absent carrier oscillations. As the error frequency rises, the filter quality G of the filter circuit 5/17 is increasingly raised by the quality setting circuit 7 so that an increasing voltage superelevation occurs at the bandpass filter 5; as a result, a transmission signal that is sufficient for reliable demodulation of the useful signal is present at the output of the bandpass filter, even at very low reception field strengths at which normally no further reception would be possible.

Figure 6:
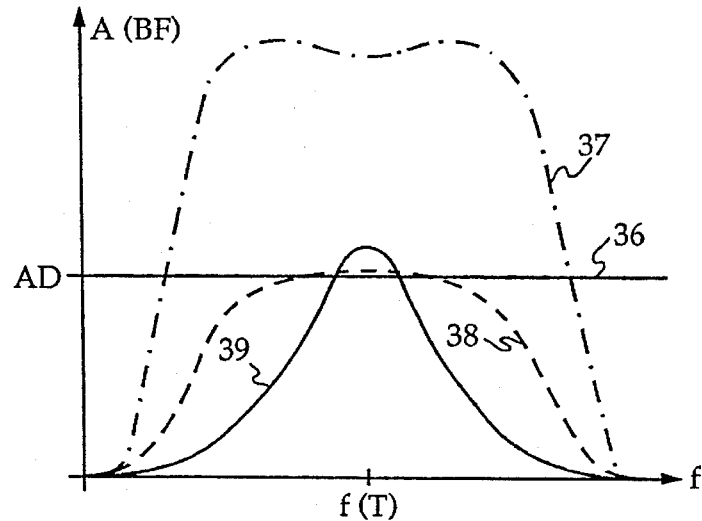
FIG. 6 shows curves for amplitude values of the FM oscillations at a bandpass filter with different filter quality settings for transmission of low, moderate, and high error frequency as indicated by the error signal circuit.

Drawn on FIG. 6 is a line 36 parallel to the frequency axis, denoting the minimum signal amplitude AD that can still be reliably demodulated by the FM demodulator 6. Also depicted schematically in the diagram in FIG. 6 are the three curves for the amplitude profile of the carrier oscillations of frequency-modulated useful signals NS transmitted to the output of the bandpass filter: a dot-dash curve 37 for an FM signal received with sufficient field strength, for which almost no error signal is detected; a dashed curve 38 for an FM signal received with a greatly attenuated field strength, over which an interference signal that greatly complicates recognition of the information in the useful signal would normally be superimposed, and for which the error signal circuit 9 already detects a high error frequency and sets a corresponding high filter quality G in the bandpass filter circuit 5/17; and lastly a solid-line curve 39 for an FM signal received with such a low field strength that normally the information in the received FM signal would be covered to the point of unrecognizability by noise and interference signals, if the bandpass filter circuit 5/17 were not set via the quality setting circuit 7, by means of an error frequency signal from the error signal circuit 9, to such a high filter quality Gm that the extremely high voltage superelevation of the undamped bandpass filter 5 still supplies an adequate FM signal for sufficiently reliable demodulation of the useful signal.

I claim:

1. A circuit arrangement to eliminate distortion from information in a useful signal (NS), which is modulated to a carrier oscillation (TS) with double sideband modulation, and which is received distorted because of transmission by a receiver, having a bandpass filter (5) that is tuned to a frequency (f(T)) of the carrier oscillation (TS), which precedes a demodulator (6) of the receiver, and having an error signal circuit (9) for controlling a transfer factor of the bandpass filter (5), which recognizes oscillations in the bandpass filter (5), whose amplitude remains below a threshold value (SW) adjusted by the error signal circuit (9), and that produces an error rate signal (FS) corresponding to a frequency of recognized error oscillations, characterized in that a quality setting circuit (7) is connected to the bandpass filter (5) and has a quality transducer curve (10) set in the quality setting circuit (7), having a control input that receives the error rate signal (FS), resulting in an adjusting of a filter quality (G) from the bandpass filter (5) so that when the error rate signal is missing, where a filter bandwidth (Bf18) of the bandpass filter (5) is at least equal to a transmission bandwidth of the useful signal (NS), and the error signal circuit (9) produces the error rate signal (FS) at a maximum value ($FS_m$), the filter quality (G) reaches substantially a maximum quality value (Gm) before an onset of oscillation of the bandpass filter (5) and the carrier oscillation (TS) exhibits an overvoltage in an output of the bandpass filter (5).

2. A circuit arrangement according to claim 1, characterized in that at the maximum filter quality value (Gm) of the error frequency signal (FS), the voltage superevelation of the carrier oscillation (TS) at the output of the bandpass filter (5) is at least 30 Db.

3. A circuit arrangement according to claim 1, characterized in that the quality setting circuit (7) is an electronically adjustable resistance circuit, which is connected as a damping resistor to the bandpass filter (5), having a resistance that is set with a signal value of the error frequency signal delivered to a setting input of the electronically adjustable resistance circuit.

4. A circuit arrangement according to claim 3, characterized in that the electronically adjustable resistance circuit has an antiparallel diode circuit (29) that is set at a setting output (17) by means of the error frequency signal (FS).

5. A circuit arrangement according to claim 3, characterized in that the electronically adjustable resistance circuit has a field-effect transistor circuit (70) in which a source-drain segment (34) of a field-effect transistor (35) is connected as a shunting resistor, having a resistance which is set by a signal value of the error frequency signal (FS) delivered to a setting input of the field-effect transistor circuit (70).

6. A circuit arrangement according to claim 1, characterized in that the quality setting circuit (7) is an electronically adjustable feedback circuit which is connected between the output and an input of the bandpass filter (5) and having a feedback factor that is set with a signal value of the error frequency signal (FS) delivered to a setting input of the electronically adjustable feedback circuit.

* * * * *